US009622167B2

(12) United States Patent
Wang et al.

(10) Patent No.: US 9,622,167 B2
(45) Date of Patent: Apr. 11, 2017

(54) METHOD FOR SIGNALING PAYLOAD TYPE IN SIGNALING FIELD OF A FRAME

(71) Applicant: MediaTek Singapore Pte. Ltd., Singapore (SG)

(72) Inventors: Chao-Chun Wang, Taipei (TW); Chih-Shi Yee, Baoshan Township, Hsinchu County (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 76 days.

(21) Appl. No.: 14/383,175

(22) PCT Filed: Mar. 5, 2013

(86) PCT No.: PCT/CN2013/072191
§ 371 (c)(1),
(2) Date: Sep. 5, 2014

(87) PCT Pub. No.: WO2013/131469
PCT Pub. Date: Sep. 12, 2013

(65) Prior Publication Data
US 2015/0043407 A1    Feb. 12, 2015

Related U.S. Application Data

(60) Provisional application No. 61/606,620, filed on Mar. 5, 2012.

(51) Int. Cl.
*H04W 52/02* (2009.01)
*H04L 29/08* (2006.01)
(Continued)

(52) U.S. Cl.
CPC ............ *H04W 52/02* (2013.01); *H04L 69/22* (2013.01); *H04L 69/323* (2013.01); *H04L 69/324* (2013.01); *H04W 80/02* (2013.01)

(58) Field of Classification Search
None
See application file for complete search history.

(56) References Cited

U.S. PATENT DOCUMENTS 8,649,374 B2    2/2014 Lee et al.
9,385,881 B2 *  7/2016 Stahl ................. H04L 12/2832
(Continued)

FOREIGN PATENT DOCUMENTS

WO    WO 2010/131935     11/2010
WO    WO 2013052078 A1 *  4/2013  .......... H04B 7/2656

OTHER PUBLICATIONS

International Search Report dated Jun. 13, 2013.
Pietro Nicoletti: "IEEE 802.11 frame format"; Jun. 2005; pp. 1-23.

*Primary Examiner* — Hassan Kizou
*Assistant Examiner* — Deepa Belur
(74) *Attorney, Agent, or Firm* — McClure, Qualey & Rodack, LLP

(57) ABSTRACT

A method of overloading a signaling subfield for different MAC frame types is proposed to provide enhanced functionality for the wireless communications network. In one embodiment, a transmitter encodes and transmits a bit stream into a frame having one or more subfields including a signaling subfield in a physical layer header of the bit stream. The signaling subfield has a type indication field that specifies the information carried in the one or more subfields is MAC layer or PHY layer information. The signaling subfield also has a sub-type indication field that specifies a type of MAC or PHY information. A receiver that receives the bit stream and decodes information carried in the one or more subfields in accordance with the type indication field and the sub-type indication field.

21 Claims, 4 Drawing Sheets

(51) Int. Cl.
*H04L 29/06* (2006.01)
*H04W 80/02* (2009.01)

(56) References Cited

U.S. PATENT DOCUMENTS

| | | | |
|---|---|---|---|
| 2005/0152359 A1* | 7/2005 | Giesberts | H04L 1/0083 370/389 |
| 2005/0238016 A1* | 10/2005 | Nishibayashi | H04L 1/1614 370/389 |
| 2007/0058566 A1 | 3/2007 | Frederiks et al. | |
| 2008/0250294 A1* | 10/2008 | Ngo | H04L 1/007 714/752 |
| 2010/0014463 A1* | 1/2010 | Nagai | H04B 7/0695 370/328 |
| 2010/0054223 A1* | 3/2010 | Zhang | H04L 25/03343 370/338 |
| 2010/0091759 A1* | 4/2010 | Stahl | H04L 12/2832 370/347 |
| 2010/0128742 A1* | 5/2010 | Chun | H04L 12/1886 370/474 |
| 2011/0044244 A1 | 2/2011 | Etemad | |
| 2011/0080873 A1 | 4/2011 | Zhang et al. | |
| 2011/0134816 A1 | 6/2011 | Liu et al. | |
| 2011/0305176 A1 | 12/2011 | Wentink | |
| 2014/0050230 A1* | 2/2014 | Bao | H04L 1/18 370/474 |

* cited by examiner

METHOD FOR SIGNALING PAYLOAD TYPE IN SIGNALING FIELD OF A FRAME

CROSS REFERENCE TO RELATED APPLICATIONS

This application is a National Phase of PCT/CN2013/072191, filed Mar. 5, 2013, which claims priority under 35 U.S.C. §119 from U.S. Provisional Application No. 61/606,620, entitled "Overloading Scheme of the Signaling Field for Wireless Networks," filed on Mar. 5, 2012, the subject matter of which is incorporated herein by reference.

TECHNICAL FIELD

The disclosed embodiments relate generally to wireless network communications, and, more particularly, to signaling field overloading in wireless communications systems.

BACKGROUND

The Open Systems Interconnection (OSI) model is a product of the Open Systems Interconnection effort at the International Organization for Standardization. It is a prescription of characterizing and standardizing the functions of a communications system in terms of abstraction layers. Similar communication functions are grouped into logical layers. A layer serves the layer above it, and is served by the layer below it. At each layer, two entities interact with each other via a specific protocol associated with that layer by transmitting and receiving protocol data units (PDUs). Under the OSI model, seven layers are defined from bottom to top as follows: physical layer (layer 1), data link layer (layer 2), network layer (layer 3), transport layer (layer 4), session layer (layer 5), presentation layer (layer 6), and application layer (layer 7).

The physical layer defines electrical and physical specifications for devices. In particular, it defines the relationship between a device and a transmission medium. The major functions and services performed by the physical layer are: establishment and termination of a connection to a communication medium, participation in the process whereby communication resources are effectively shared among multiple users (e.g., contention resolution and flow control), and modulation or conversion between the representation of digital data in user equipment and the corresponding signals transmitted over a communications channel.

The data link layer provides the functional and procedural means to transfer data between network entities and to detect and possibly correct errors that may occur in the physical layer. The main functions of data link layer include: framing, physical addressing, flow control, error control access control, and media access control (MAC). For local area network (LAN) architecture, which was developed independently of the ISO work in IEEE project 802, the data link layer includes a MAC sub-layer and a media-independent logical link control (LLC) sub-layer. The MAC sublayer manages the interaction of devices with a shared medium, while the LLC sublayer deals with addressing and multiplexing on multi-access media.

In wireless communications systems, wireless devices communicate with each other through various well-defined frame structures. Exchanged bit streams in the physical layer are arranged temporally into sequences called frames. Frames are in turn divided into very specific and standardized sections. For example, the current IEEE 802.11 standards, which specify wireless local area network (WLAN) computer communication protocols in the 2.4, 3.6, 5, and 60 GHz frequency bands, define various frame types for use in transmission of data as well as management and control of wireless links.

In general, a frame comprises sequentially of a PLCP PPDU, a frame header, and a payload. The PLCP PPDU further comprises a preamble, a PPDU header, and a PPDU payload. The PPDU header has one or more signaling fields. Conventionally, a signaling field carries information pertinent to the operation of the physical layer. To decode a frame, the receiver uses the information in the signaling field to determine how to decode the remainder of the frame. The conventional design separates the PHY and MAC layer information by layering them on top of each other and there is no intermingling of the information. For example, each MAC layer frame consists of a MAC header and a MAC payload. The first two bytes of the MAC header form a frame control field specifying the form and function of the frame. Such frame control field must be decoded and then processed in the MAC layer after PHY layer decoding and processing.

To conserve energy, especially for battery powered wireless communications device, it is desired that there is information in the preamble of a frame that facilitates early termination. That is, a receiving wireless device terminates the decoding process earlier. One common approach is to include a full or partial station association identifier (AID) of a wireless communications device into the physical layer header. The Partial AID is a non-unique identifier of a station based on its AID. The wireless communications device stops the decoding process immediately if it finds out that the AID or Partial AID in the receiving frame does not belong to itself. Using AID or partial AID on all type of frames is a generic way to facilitate earlier termination. However, it only provides limited benefit because it does not differentiate frame types defined in wireless communications standards such as null data, control, and management frames for different purposes. A solution to achieve early termination based on frame type is sought.

SUMMARY

A method of overloading a signaling subfield for different MAC frame types is proposed to provide enhanced functionality for the wireless communications network. In one embodiment, a transmitter encodes and transmits a bit stream into a frame having one or more subfields including a signaling subfield in a physical layer header of the bit stream. The signaling subfield has a type indication field that specifies the information carried in the one or more subfields is MAC layer or PHY layer information. The signaling subfield also has a sub-type indication field that specifies a type of MAC or PHY information. A receiver that receives the bit stream and decodes information carried in the one or more subfields in accordance with the type indication field and the sub-type indication field.

In one example, the bit stream is a short MAC control frame without a MAC header and a MAC payload. Certain bits in the signaling subfield are overloaded for early indication of different MAC frame types. The type indication field specifies that the one or more subfields carry MAC layer information and the sub-type indication field specifies a specific MAC control frame type. Depending on the sub-type indication, the MAC control frame may be an acknowledging frame, a poll frame, or a request frame. In certain networks, the early indication can be used to achieve power saving.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
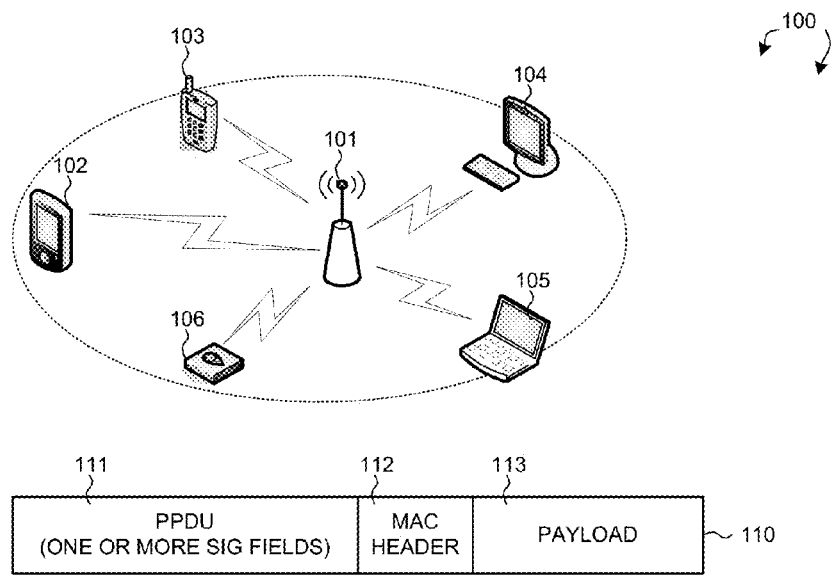
FIG. 1 illustrates a wireless communications system and a frame structure with signaling field overloading.

FIG. 1 illustrates a wireless communications system 100 and a frame 110 in accordance with one novel aspect. Wireless communications system 100 comprises a wireless access point AP 101, and a plurality of wireless access terminals 102-106. In wireless communications system 100, the wireless devices communicate with each other through various well-defined frame structures. A typical frame comprises a Physical Layer Convergence Procedure (PLCP) Protocol Data Unit (PPDU), a frame header, and a payload. For example, frame 110 comprises a PPDU 111, a MAC frame header 112, and a MAC payload 113. PPDU 111 further includes a PLCP header having one or more signaling subfields. Conventionally, a signaling field carries information pertinent to the operation of the physical layer. To decode a frame, the receiver uses the information in the signaling field to determine how to decode the remainder of the frame. The conventional design separates the PHY and MAC layer information by layering them on top of each other and there is no intermingling of the information.

In one novel aspect, a method of overloading the signaling subfields for different MAC frame types is proposed to provide enhanced functionality for the wireless communications network. In one embodiment, PLCP PPDU 111, via the one or more signaling subfields, comprises a type indication field that specifies information carried in the one or more signaling subfields is PHY layer or MAC layer information. The type indication field allows the receiver to distinguish whether the received frame is of certain frame types or not. This allows early indication as to whether to further process the frame or not. The method also allows some of the bits within the signaling field to indicate different functionalities based on the types of the frame.

Figure 2:
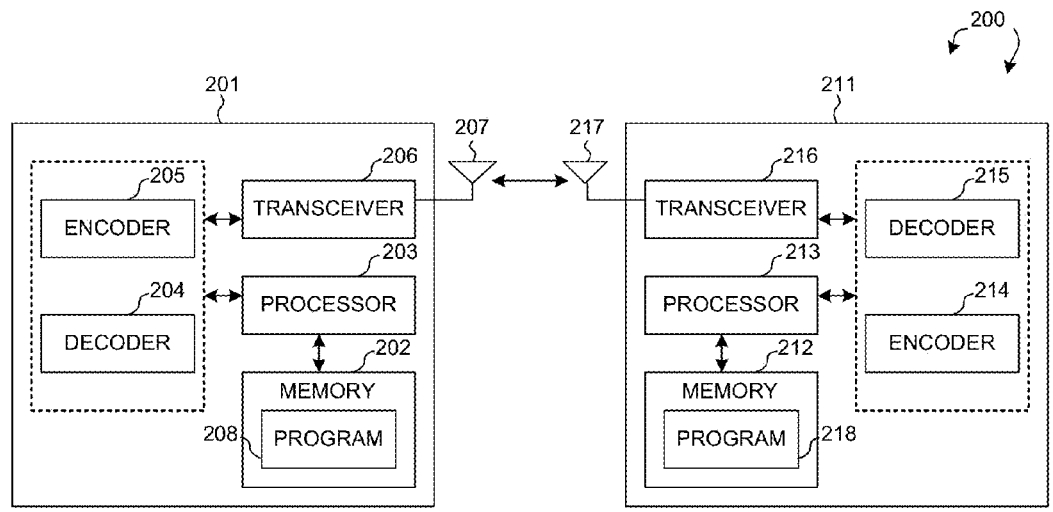
FIG. 2 is a simplified block diagram of a wireless transmitting device and a receiving device in accordance with a novel aspect.

FIG. 2 is a simplified block diagram of wireless devices 201 and 211 in accordance with a novel aspect. For wireless device 201, antenna 207 transmits and receives radio signals. RF transceiver module 206, coupled with the antenna, receives RF signals from the antenna, converts them to baseband signals and sends them to processor 203. RF transceiver 206 also converts received baseband signals from the processor, converts them to RF signals, and sends out to antenna 207. Processor 203 processes the received baseband signals and invokes different functional modules to perform features in wireless device 201. Memory 202 stores program instructions and data 208 to control the operations of the wireless device.

Similar configuration exists in wireless device 211 where antenna 217 transmits and receives RF signals. RF transceiver module 216, coupled with the antenna, receives RF signals from the antenna, converts them to baseband signals and sends them to processor 213. The RF transceiver 216 also converts received baseband signals from the processor, converts them to RF signals, and sends out to antenna 217. Processor 213 processes the received baseband signals and invokes different functional modules to perform features in wireless device 211. Memory 212 stores program instructions and data 218 to control the operations of the wireless device.

The wireless devices 201 and 211 also include several functional modules to carry out some embodiments of the present invention. Encoder modules 205 and 215 convert original information from one format to another, while decoder modules 204 and 214 reverse the operation of the encoders so that the original information can be retrieved. The different functional modules can be implemented by software, firmware, hardware, or any combination thereof. The function modules, when executed by the processors 203 and 213 (e.g., via executing program codes 208 and 218), for example, allow device 201 to encode and transmit a bit stream to device 211, and allow device 211 to receive and decode the bit stream accordingly. In one example, at the transmitter side, the encoder inserts a type indication field of a signaling subfield into a bit stream. The type indication field specifies information carried in the signaling subfields is PHY layer or MAC layer information. At the receiver side, the decoder examines the type indication field and retrieves PHY layer or MAC layer information accordingly.

Figure 3:
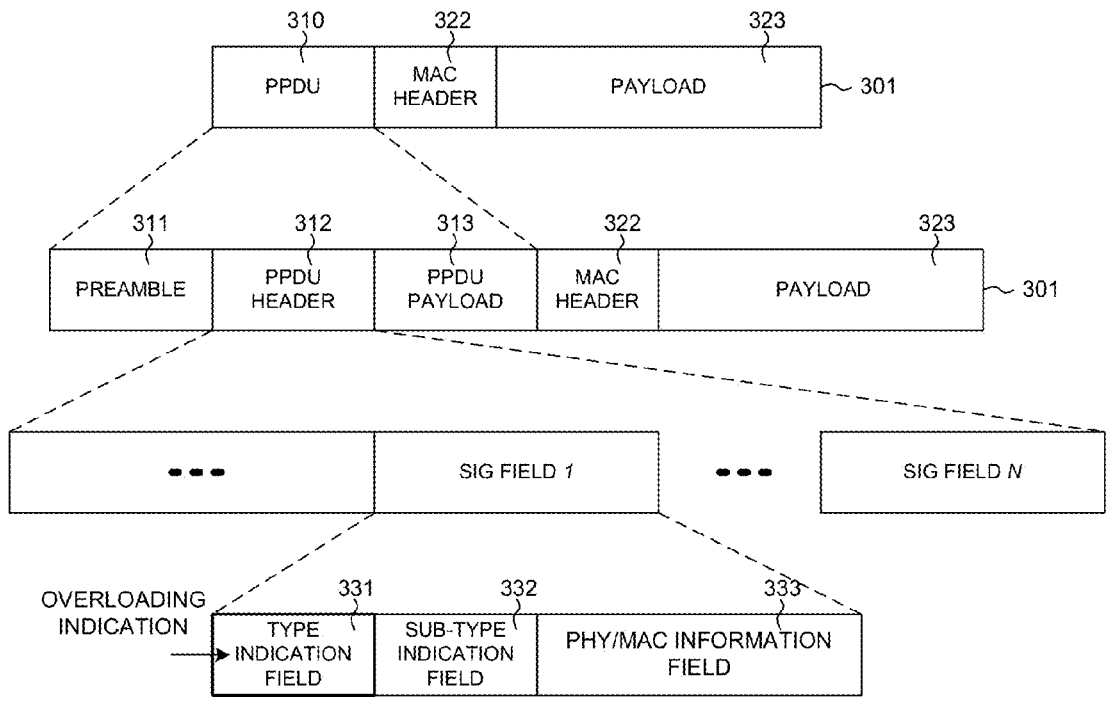
FIG. 3 is a diagram of a frame structure that illustrates signaling field overloading.

FIG. 3 is a diagram of a frame structure that illustrates signaling field overloading. In wireless communications systems, a bit stream comprises of a plurality of fields, which is defined as a frame. Frame 301 comprises a physical layer convergence procedure (PLCP) protocol data unit (PPDU) 310, a MAC frame header 322, and a payload 323. PPDU 310 consists of a PLCP preamble 311, a PLCP header 312, and a PLCP payload 313. The layer above the PHY layer is the media access control (MAC) layer, which manages the interaction of devices with a shared medium. From MAC layer perspective, frame 301 comprises a MAC frame header 322 and a payload 323. The first two bytes of the MAC header form a frame control field specifying the form and function of the frame.

PPDU header 312 further comprises one or more signaling subfields (SIG FIELD 1 ... SIG FIELD n) as illustrated in FIG. 3. Conventionally, PLCP header 312 carries information pertinent to the operation of the physical layer via the signaling subfields. For example, PLCP header 312 carries information such as frame length, modulation and coding scheme (MCS), number of spatial streams, STBC (Space-time block code) parity check bits, etc. The MCS and the number of spatial streams allow the receiving device to decode the frame payload. The receiving device can use the frame length and other related information elements, such as MCS and guard interval length, to calculate the time duration of the received frame. Only after properly decoding the physical layer information carried in the signaling subfields, the receiving device is able to retrieve further information contained in the MAC layer, which contains the MAC header and payload.

In one novel aspect, some bits in the SIG FIELDS can be overloaded to indicate whether the SIG FIELDs carries PHY layer or MAC layer information. For example, at least one of the signaling subfields in the PLCP header, e.g. SUB FIELD 1, comprises a type indication field 331, a sub-type indication filed 332, and associated PHY or MAC layer information field 333. The type indication field specifies whether the signaling subfield and/or other signaling subfields contain PHY layer information or MAC layer information. For example, if type indication field=0, then the sub-type indication field 332 carries information about a type of the frame, and the remaining field 333 in SIG FIELD 1 carries PHY layer information. On the other hand, if type indication field=1, then the sub-type indication field 332 carries information about a type of the frame, and the remaining field 333 in SIG FIELD 1 carries MAC layer information.

Figure 4:
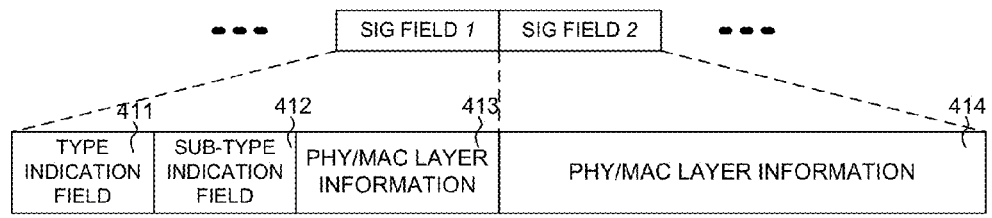
FIG. 4 illustrates detailed embodiments of signaling field overloading.
Figure 4:
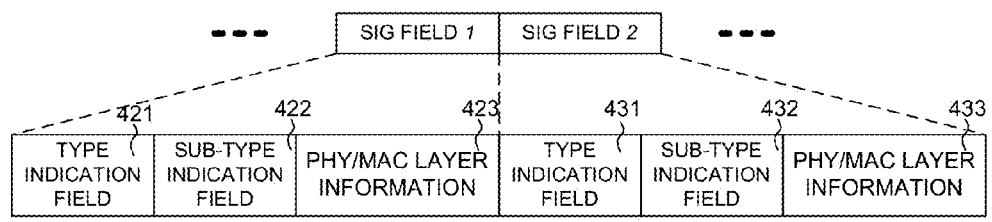

FIG. 4 illustrates detailed embodiments of signaling field overloading. In the example of FIG. 4, a PPDU header of a frame comprises a first signaling subfield SIG FIELD 1 and a second signaling subfield SIG FIELD 2. In the top diagram of FIG. 4, SIG FIELD 1 further comprises a type indication field 411, a sub-type indication field 412, and an information field 413. SIG FIELD 2 comprises only an information field 414. The type indication field 411 specifies that the remaining fields of the signaling subfield SIG FIELD 1 and SIG FIELD 2 carrying PHY or MAC layer information. Accordingly, the sub-type indication filed 412 indicates a specific type of the frame, and information field 413 carrying PHY or MAC layer information associated with the specific type of the frame. Furthermore, information field 414 carries additional PHY or MAC layer information associated with the specific type of the frame.

In the bottom diagram of FIG. 4, SIG FIELD 1 comprises a type indication field 421, a sub-type indication field 422, and an information field 423. SIG FIELD 2 also comprises a type indication field 431, a sub-type indication field 432, and an information field 433. The type indication field 421 specifies that the remaining fields of the signaling subfield SIG FIELD 1 carrying PHY or MAC layer information. Accordingly, the sub-type indication filed 422 indicates a specific type of the frame, and information field 423 carrying addition PHY or MAC layer information associated with the specific type of the frame. Similarly, the type indication field 431 independently specifies that the remaining fields of the signaling subfield SIG FIELD 2 carrying PHY or MAC layer information. For example, SIG FIELD 1 may carry PHY layer information while SIG FIELD 2 may carry MAC layer information.

Figure 5A:
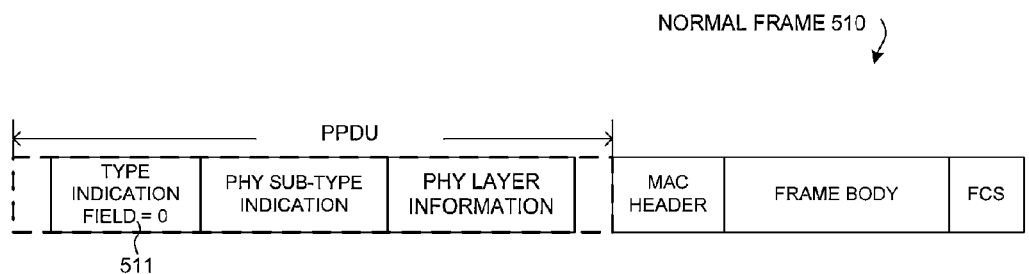
FIG. 5A is a diagram of a normal frame with signaling field carrying PHY layer information. The normal frame includes a MAC header and a MAC payload.

FIG. 5A is a diagram of a normal frame 510 with signaling field carrying PHY layer information. Normal frame 510 comprises a PPDU, a MAC header and a MAC payload including a frame body and an FCS (frame check sequence). The PPDU comprises a PPDU header having one or more sub fields. At least one of the sub fields is a signaling field that contains a type indication field 511. In the example of FIG. 5A, the type indication=0, which specifies that the PPDU header carries additional PHY layer information. This means that frame 510 is a normal frame without signaling field overloading.

Figure 5B:
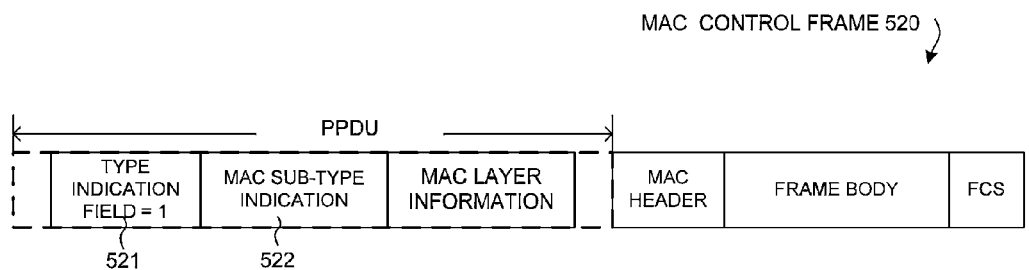
FIG. 5B is a diagram of a MAC control frame with signaling field carrying MAC layer information. The MAC control frame includes a MAC header and a MAC payload.

FIG. 5B is a diagram of a MAC control frame 520 with signaling field carrying MAC layer information. MAC control frame 520 comprises a PPDU, a MAC header and a MAC payload including a frame body and an FCS (frame check sequence). The PPDU comprises a PPDU header having one or more sub fields. At least one of the sub fields is a signaling field that contains a type indication field 521. In the example of FIG. 5B, the type indication=1, which specifies that the PPDU header also carries MAC layer information, such as a MAC sub-type indication field 522 that indicates a type of the MAC control frame, and additional MAC layer information.

Figure 5C:
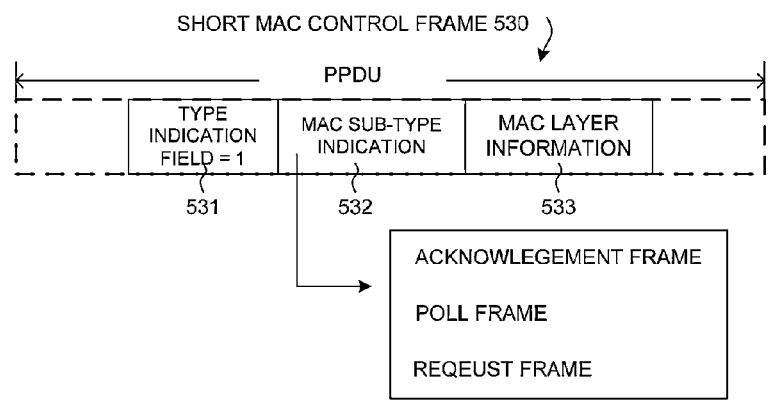
FIG. 5C is a diagram of a short MAC control frame with signaling field carrying MAC layer information. The short MAC control frame does not include a MAC header and a MAC payload.

FIG. 5C is a diagram of a short MAC control frame 530 with signaling field carrying MAC layer information. The short MAC control frame 530 comprises a PPDU, but does not include a MAC header and a MAC payload. The PPDU comprises a PPDU header having one or more subfields. At least one of the sub field is a signaling field that further comprises a type indication field 531. In the example of FIG. 5C, the type indication=1, which specifies that the PPDU header also carries MAC layer information, such as a MAC sub-type indication field 532 that indicates a type of the short MAC control frame and addition MAC layer information carried in information field 533. There are different subtypes of short MAC control frames. The MAC sub-type indication field 532 can be used to specify a specific type of the short MAC control frame 530. For example, if the sub-type indication field has two bits, it can indicate four different types of the short MAC control frames. If the sub-type indication field has three bits, it can indicate six different types of the short MAC control frames, and so on so forth.

In a first example, the short MAC control frame is an acknowledgment frame that acknowledges whether one or more frames have been successfully received by a receiver. In a second example, the short MAC control frame is a poll frame that polls a transmitter whether there is data pending for a receiver. In a third example, the short MAC control frame is a request frame that requests certain information about a wireless communications network. Under those examples, the MAC layer information field 533 carries additional MAC layer information such as: the receiver or transmitter addresses, AID/TA, BSSID, fragment number of PDUs to be acknowledged, etc.

Figure 6:
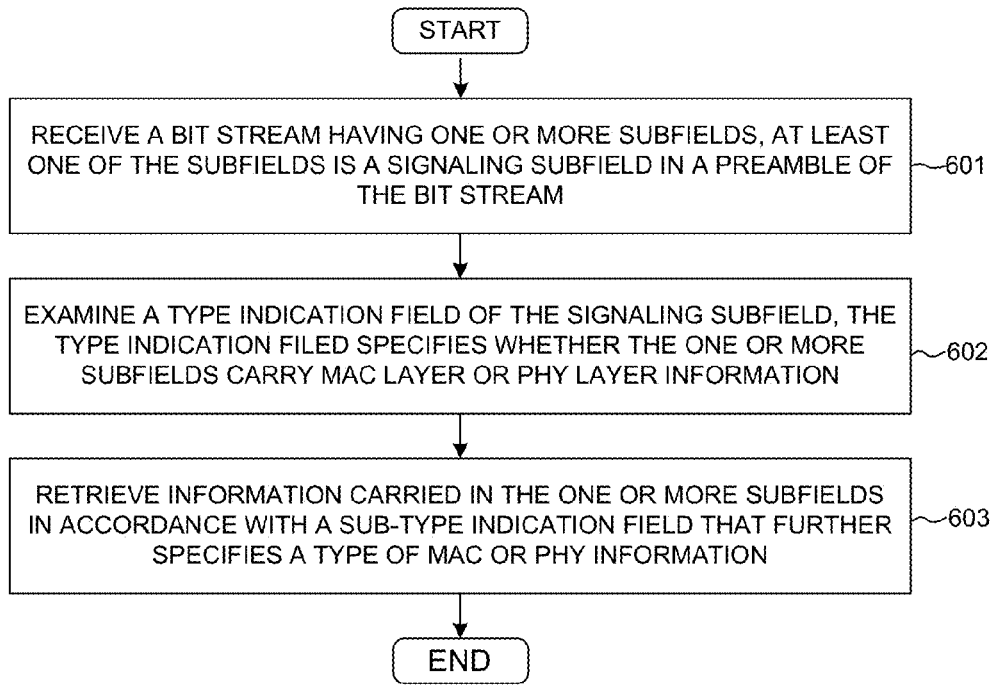
FIG. 6 is flow chart of a method of receiving and decoding a bit stream with signaling field overloading in accordance with a novel aspect.

FIG. 6 is flow chart of a method of receiving and decoding a bit stream with signaling field overloading in accordance with a novel aspect. In step 601, a receiving device receives a bit stream having one or more subfields in a wireless communications network. At least one of the subfields is a signaling subfield belongs to a physical layer header of the bit stream. In step 602, the receiving device examines a type indication field of the signaling field. The type indication field specifies whether the one or more subfields carry MAC layer or PHY layer information. In step 603, the receiving device retrieves information carried in the one or more subfields in accordance with a sub-type indication field that further specifies a type of the MAC or PHY information.

Figure 7:
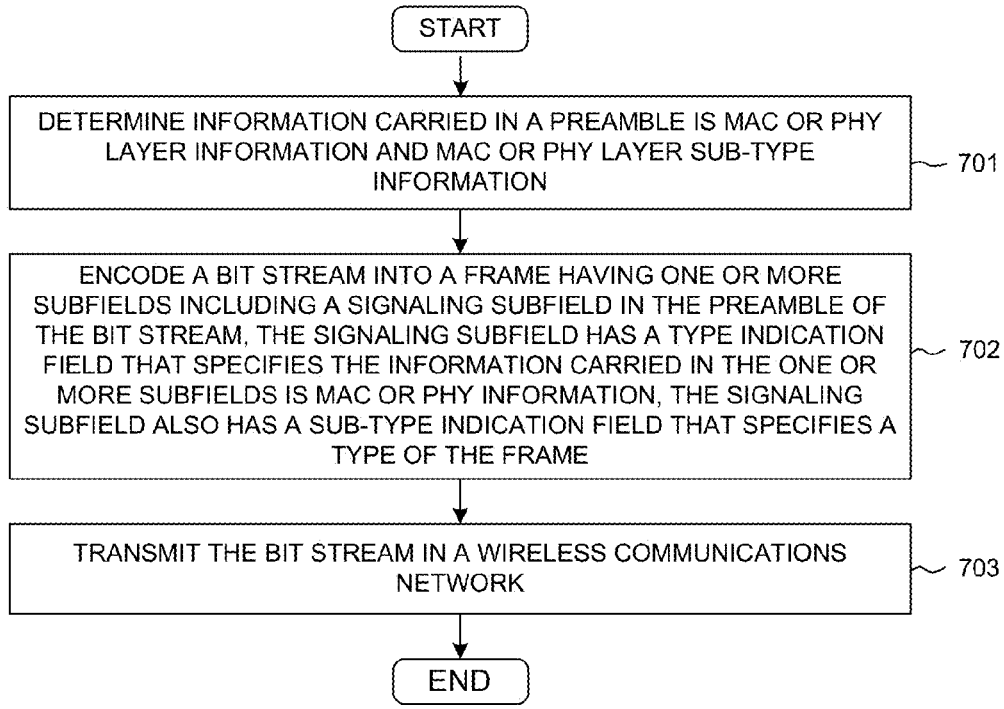
FIG. 7 is a flow chart of a method of encoding and transmitting a bit stream with signaling field overloading in accordance with a novel aspect.

FIG. 7 is a flow chart of a method of encoding and transmitting a bit stream with signaling field overloading in accordance with a novel aspect. In step 701, a transmitting device determines information carried in a physical layer header is MAC or PHY layer information and further determines MAC or PHY layer sub-type information. In step 702, the transmitting device encodes a bit stream into a frame having one or more subfields including a signaling subfield in the preamble of the bit stream. The signaling subfield has a type indication field that specifies the information carried in the one or more subfields is MAC or PHY information. The signaling subfield also has a sub-type indication field that specifies a type of the frame. In step 703, the transmitting device transmits the bit stream to a receiving device in a wireless communications network.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

The invention claimed is:

1. A method comprising:
    (a) receiving a bit stream having one or more subfields in a wireless communications system, wherein at least one of the subfields is a signaling subfield in a physical layer header of the bit stream;
    (b) examining a type indication field of the signaling subfield, wherein the type indication field specifies whether the one or more subfields carry media access control (MAC) layer or physical (PHY) layer information; and
    (c) retrieving information carried in the one or more subfields in accordance with a sub-type indication field of the signaling subfield, wherein the sub-type indication field further specifies a type of MAC or PHY information.

2. The method of claim 1, wherein the bit stream is a short MAC control frame, and wherein the type indication field indicates the one or more subfields carrying MAC layer information, and wherein the short MAC control frame does not include a MAC header and a MAC payload.

3. The method of claim 2, wherein the sub-type indication field indicates the one or more subfields carrying information that acknowledges one or more frames being received successfully by a receiver.

4. The method of claim 2, wherein the sub-type indication field indicates the one or more subfields carrying information that polls a transmitter whether there is data pending for a receiver.

5. The method of claim 2, wherein the sub-type indication field indicates the one or more subfields carrying information that requests information about a wireless communications network.

6. The method of claim 1, wherein the bit stream is a normal frame, and wherein the type indication field indicates the one or more subfields carrying PHY layer information, and wherein the MAC frame includes a MAC header and a MAC payload.

7. The method of claim 1, wherein the bit stream is a MAC control frame, and wherein the type indication field indicates the one or more subfields carrying MAC layer information, and wherein the MAC control frame includes a MAC header and a MAC payload.

8. A method comprising:
    (a) determining information carried in a physical layer header is media access control (MAC) or physical (PHY) layer information and MAC layer or PHY layer sub-type information;
    (b) encoding a bit stream into a frame having one or more subfields including a signaling subfield in the physical layer header of the bit stream, wherein the signaling subfield has a type indication field that specifies the information carried in the one or more subfields is MAC layer or PHY layer information, and wherein the signaling subfield also has a sub-type indication field that specifies a type of the frame; and
    (c) transmitting the bit stream in a wireless communications network.

9. The method of claim 8, wherein the bit stream is a short MAC control frame, and wherein the type indication field indicates the one or more subfields carrying MAC layer information, and wherein the short MAC control frame does not include a MAC header and a MAC payload.

10. The method of claim 9, wherein the sub-type indication field indicates the one or more subfields carrying information that acknowledges one or more frames being received successfully by a receiver.

11. The method of claim 9, wherein the sub-type indication field indicates the one or more subfields carrying information that polls a transmitter whether there is data pending for a receiver.

12. The method of claim 9, wherein the sub-type indication field indicates the one or more subfields carrying information that requests information about a wireless communications network.

13. The method of claim 8, wherein the bit stream is a normal frame, and wherein the type indication field indicates the one or more subfields carrying PHY layer information, and wherein the MAC frame includes a MAC header and a MAC payload.

14. The method of claim 8, wherein the bit stream is a MAC control frame, and wherein the type indication field indicates the one or more subfields carrying MAC layer information, and wherein the MAC control frame includes a MAC header and a MAC payload.

15. A wireless communication system, comprising:
    a transmitter that encodes and transmits a bit stream into a frame having one or more subfields including a signaling subfield in a physical layer header of the bit stream, wherein the signaling subfield has a type indication field that specifies the information carried in the one or more subfields is media access control (MAC) layer or physical (PHY) layer information, and wherein the signaling subfield also has a sub-type indication field that specifies a type of the frame; and
    a receiver that receives the bit stream and decodes information carried in the one or more subfields in accordance with the type indication field and the sub-type indication field.

16. The system of claim 15, wherein the bit stream is a short MAC control frame, and wherein the type indication field indicates the one or more subfields carrying MAC layer information, and wherein the short MAC control frame does not include a MAC header and a MAC payload.

17. The system of claim 16, wherein the sub-type indication field indicates the one or more subfields carrying information that acknowledges one or more frames being received successfully by the receiver.

18. The system of claim 16, wherein the sub-type indication field indicates the one or more subfields carrying information that polls the transmitter whether there is data pending for the receiver.

19. The system of claim 16, wherein the sub-type indication field indicates the one or more subfields carrying information that requests information about a wireless communications network.

20. The system of claim 15, wherein the bit stream is a normal frame, and wherein the type indication field indicates the one or more subfields carrying PHY layer information, and wherein the MAC frame includes a MAC header and a MAC payload.

21. The system of claim 15, wherein the bit stream is a MAC control frame, and wherein the type indication field indicates the one or more subfields carrying MAC layer information, and wherein the MAC control frame includes a MAC header and a MAC payload.

* * * * *